(12) United States Patent
Sheng et al.

(10) Patent No.: US 12,020,463 B2
(45) Date of Patent: Jun. 25, 2024

(54) POSITIONING METHOD, ELECTRONIC DEVICE AND STORAGE MEDIUM

(71) Applicant: Zhejiang SenseTime Technology Development Co., Ltd., Zhejiang (CN)

(72) Inventors: Chongshan Sheng, Hangzhou (CN); Guofeng Zhang, Hangzhou (CN)

(73) Assignee: Zhejiang SenseTime Technology Development Co., Ltd., Zhejiang (CN)

( * ) Notice: Subject to any disclaimer, the term of this patent is extended or adjusted under 35 U.S.C. 154(b) by 280 days.

(21) Appl. No.: 17/510,463

(22) Filed: Oct. 26, 2021

(65) Prior Publication Data

US 2022/0043164 A1 Feb. 10, 2022

Related U.S. Application Data

(63) Continuation of application No. PCT/CN2020/080464, filed on Mar. 20, 2020.

(30) Foreign Application Priority Data

Jun. 27, 2019 (CN) .......................... 201910568726.8

(51) Int. Cl.
*G06V 10/20* (2022.01)
*G01S 19/42* (2010.01)
*G06V 10/22* (2022.01)
*G06V 10/24* (2022.01)

(52) U.S. Cl.
CPC ............ *G06V 10/225* (2022.01); *G01S 19/42* (2013.01); *G06V 10/245* (2022.01)

(58) Field of Classification Search
None
See application file for complete search history.

(56) References Cited

U.S. PATENT DOCUMENTS 8,447,519 B2 * 5/2013 Basnayake .............. G01S 19/40
701/445
8,630,461 B2 * 1/2014 Miyajima .......... G01C 21/3647
382/104
9,208,389 B2 * 12/2015 Sung ..................... G01S 19/485
(Continued)

FOREIGN PATENT DOCUMENTS

CN 102927988 A 2/2013
CN 106295512 A 1/2017
(Continued)

OTHER PUBLICATIONS

International Search Report in the international application No. PCT/CN2020/080464, dated Jun. 19, 2020, 2 pgs.
(Continued)

*Primary Examiner* — Jonathan M Dager
(74) *Attorney, Agent, or Firm* — Cooper Legal Group, LLC (57) ABSTRACT

Provided is a positioning method and device, an electronic device and a storage medium. The method includes that: an identification image captured at a first site is acquired; according to identification information of a first identifier extracted from the identification image, position information of the first identifier is determined; and position information of the first site is determined based on the position information of the first identifier and projection information of the first identifier in the identification image.

16 Claims, 5 Drawing Sheets

(56) References Cited

U.S. PATENT DOCUMENTS

| | | | |
|---|---|---|---|
| 9,587,948 B2* | 3/2017 | Schuller | G05D 1/0274 |
| 9,631,943 B2* | 4/2017 | Shashua | G01C 21/32 |
| 9,719,801 B1* | 8/2017 | Ferguson | G01C 21/005 |
| 9,767,372 B2* | 9/2017 | Yamanoi | G06V 10/98 |
| 9,884,623 B2* | 2/2018 | Fasola | G06V 20/647 |
| 9,933,515 B2* | 4/2018 | Prokhorov | G01S 7/4972 |
| 9,939,813 B2* | 4/2018 | Shashua | G05D 1/0253 |
| 10,145,692 B2* | 12/2018 | Okuyama | G08G 1/0969 |
| 10,260,889 B2* | 4/2019 | Yamaguchi | G01C 21/30 |
| 10,365,363 B2* | 7/2019 | Rohr | G01C 21/12 |
| 10,459,089 B2* | 10/2019 | Van Diggelen | G01S 5/015 |
| 10,534,370 B2* | 1/2020 | Cavalcanti | G08G 1/091 |
| 10,788,327 B2* | 9/2020 | Hawkins | G05D 1/0246 |
| 10,885,787 B2* | 1/2021 | Lee | B60W 30/0953 |
| 10,890,453 B2* | 1/2021 | Tateishi | G06F 16/29 |
| 10,921,461 B2* | 2/2021 | Tan | G01S 19/49 |
| 11,112,252 B2* | 9/2021 | Gokhale | G01S 17/86 |
| 11,125,575 B2* | 9/2021 | Xu | G01S 5/16 |
| 11,153,708 B2* | 10/2021 | Smith | H01Q 25/005 |
| 11,255,974 B2* | 2/2022 | Choi | G01S 13/89 |
| 11,514,681 B2* | 11/2022 | Kaku | B60W 50/0205 |
| 11,541,910 B1* | 1/2023 | Ganguli | B60W 30/18163 |
| 11,623,664 B1* | 4/2023 | Ganguli | B60Q 5/006 |
| | | | 701/26 |
| 11,710,358 B2* | 7/2023 | Vaccariello | G07C 9/00309 |
| | | | 340/5.61 |
| 2008/0319657 A1* | 12/2008 | Gao | G01C 21/30 |
| | | | 701/532 |
| 2009/0228204 A1* | 9/2009 | Zavoli | G01C 21/30 |
| | | | 701/532 |
| 2010/0061591 A1* | 3/2010 | Okada | G08G 1/167 |
| | | | 382/103 |
| 2011/0161032 A1* | 6/2011 | Stahlin | G01C 21/30 |
| | | | 702/94 |
| 2014/0358322 A1* | 12/2014 | Ibrahim | G05D 1/0055 |
| | | | 701/1 |
| 2014/0379254 A1* | 12/2014 | Miksa | G01C 21/30 |
| | | | 701/450 |
| 2015/0081211 A1* | 3/2015 | Zeng | G01S 19/42 |
| | | | 701/446 |
| 2015/0185735 A1* | 7/2015 | Liang | G06V 20/56 |
| | | | 701/523 |
| 2015/0345974 A1* | 12/2015 | Takahashi | G01C 21/3602 |
| | | | 701/461 |
| 2016/0069985 A1* | 3/2016 | Kwakkernaat | G08G 1/04 |
| | | | 342/146 |
| 2016/0116289 A1* | 4/2016 | Friend | G01S 19/393 |
| | | | 701/518 |
| 2016/0363647 A1* | 12/2016 | Zeng | G06V 20/582 |
| 2017/0023659 A1* | 1/2017 | Bruemmer | G01S 5/0278 |
| 2017/0038477 A1* | 2/2017 | Schmid | G01S 19/51 |
| 2017/0075355 A1* | 3/2017 | Micks | G05D 1/0274 |
| 2017/0167883 A1* | 6/2017 | Pink | G01C 21/30 |
| 2017/0291603 A1* | 10/2017 | Nakamura | B60W 30/18163 |
| 2017/0329332 A1* | 11/2017 | Pilarski | B60W 30/0956 |
| 2018/0045516 A1* | 2/2018 | Sumizawa | G01C 21/005 |
| 2018/0045519 A1* | 2/2018 | Ghadiok | G06F 16/2379 |
| 2018/0087907 A1* | 3/2018 | DeBitetto | G01S 19/48 |
| 2018/0286237 A1 | 10/2018 | Hu et al. | |
| 2018/0307917 A1* | 10/2018 | Mittal | G05D 1/0246 |
| 2018/0328741 A1* | 11/2018 | Pratt | G06V 20/588 |
| 2018/0341273 A1* | 11/2018 | Micks | G05D 1/0274 |
| 2019/0086928 A1* | 3/2019 | Chen | G01C 21/3492 |
| 2019/0163197 A1* | 5/2019 | Qiao | G06V 20/582 |
| 2019/0294898 A1* | 9/2019 | Jin | G08G 1/0116 |
| 2020/0025575 A1* | 1/2020 | Weissman | G05D 1/0088 |
| 2020/0132473 A1* | 4/2020 | Shipley | G01C 21/1652 |
| 2020/0279489 A1* | 9/2020 | Liu | G08G 1/20 |
| 2021/0016794 A1* | 1/2021 | Taki | G01C 21/3602 |
| 2022/0066051 A1* | 3/2022 | Hirohata | G01S 13/86 |

FOREIGN PATENT DOCUMENTS

| | | |
|---|---|---|
| CN | 108007474 A | 5/2018 |
| CN | 109341691 A | 2/2019 |
| JP | 2013231607 A | 11/2013 |
| JP | 2016164518 A | 9/2016 |
| TW | 201107713 A | 3/2011 |
| WO | 2016163563 A1 | 10/2016 |
| WO | 2019106847 A1 | 6/2019 |

OTHER PUBLICATIONS

First Office Action of the Chinese application No. 201910568726.8, dated May 11, 2021, 12 pgs.
First Office Action of the Japanese application No. 2021-564294, dated Dec. 5, 2022, 7 pgs.

* cited by examiner

POSITIONING METHOD, ELECTRONIC DEVICE AND STORAGE MEDIUM

CROSS-REFERENCE TO RELATED APPLICATION

The present disclosure is a continuation of International Application No. PCT/CN2020/080464, filed on Mar. 20, 2020, which claims priority to Chinese Patent Application No. 201910568726.8, filed on Jun. 27, 2019 and entitled "Positioning Method and Device, Electronic Device and Storage Medium". The contents of International Application No. PCT/CN2020/080464 and Chinese Patent Application No. 201910568726.8 are hereby incorporated by reference in their entireties.

BACKGROUND

With the development of electronic technologies, the positioning technology greatly facilitates daily life of people. For example, a position where a user is located may be determined by the positioning technology, and a travel route and the like may be planned automatically. At present, a Global Positioning System (GPS) is typically used for outdoor positioning, with a positioning error being about 10 m, which meets the requirement in the daily life.

SUMMARY

The present disclosure relates to the field of electronic technologies and provides a positioning method and device, an electronic device and storage medium.

According to a first aspect of the present disclosure, a positioning method is provided, which may include the following operations.

An identification image captured at a first site is acquired; according to identification information of a first identifier extracted from the identification image, position information of the first identifier is determined; and position information of the first site is determined based on the position information of the first identifier and projection information of the first identifier in the identification image.

According to a second aspect of the present disclosure, a positioning device is provided, which may include: an acquisition module, configured to acquire an identification image captured at a first site; a first determination module, configured to determine, according to identification information of a first identifier extracted from the identification image, position information of the first identifier; and a second determination module, configured to determine position information of the first site based on the position information of the first identifier and projection information of the first identifier in the identification image.

According to a third aspect of the present disclosure, an electronic device is provided, which may include: a processor and a memory.

The memory is coupled with the processor and is configured to store an instruction executable by the processor.

The processor is configured to acquire an identification image captured at a first site; determine, according to identification information of a first identifier extracted from the identification image, position information of the first identifier; and determine position information of the first site based on the position information of the first identifier and projection information of the first identifier in the identification image.

According to a fourth aspect of the present disclosure, a non-transitory computer-readable storage medium is provided, which has stored thereon a computer program instruction that, when executed by a processor, causes the processor to: acquire an identification image captured at a first site; determine, according to identification information of a first identifier extracted from the identification image, position information of the first identifier; and determine position information of the first site based on the position information of the first identifier and projection information of the first identifier in the identification image.

According to a fifth aspect of the present disclosure, a computer program is provided; the computer program includes a computer-readable code that, when being run in an electronic device, causes a processor in the electronic device to perform the positioning method in the first aspect.

It is to be understood that the above general descriptions and detailed descriptions below are only exemplary and explanatory and not intended to limit the present disclosure.

According to the following detailed descriptions on the exemplary embodiments with reference to the accompanying drawings, other characteristics and aspects of the present disclosure will become apparent.

BRIEF DESCRIPTION OF THE DRAWINGS

The accompanying drawings, which are incorporated in and constitute a part of this specification, illustrate embodiments consistent with the present disclosure and, together with the specification, serve to explain the principles of the present disclosure.

DETAILED DESCRIPTION

Various exemplary embodiments, features and aspects of the present disclosure will be described below in detail with reference to the accompanying drawings. The same numerals in the accompanying drawings indicate the same or similar components. Although various aspects of the embodiments are illustrated in the accompanying drawings, the accompanying drawings are unnecessarily drawn according to a proportion unless otherwise specified.

As used herein, the word "exemplary" means "serving as an example, instance, or illustration". Thus, any embodiment described herein as "exemplary" is not necessarily to be construed as preferred or advantageous over other embodiments.

The term "and/or" in the present disclosure is only an association relationship for describing associated objects and represents that three relationships may exist. For example, A and/or B may represent the following three cases: only A exists, both A and B exist, and only B exists. In addition, the term "at least one" herein represents any one of multiple or any combination of at least two of multiple, for example, at least one of A, B or C may represent any one or multiple elements selected from a set formed by the A, the B and the C.

In addition, for describing the present disclosure better, many specific details are presented in the following specific implementation modes. It is to be understood by those skilled in the art that the present disclosure may still be implemented even without some specific details. In some examples, methods, means, components and circuits known very well to those skilled in the art are not described in detail, to highlight the subject of the present disclosure.

According to positioning solutions provided by the embodiments of the present disclosure, an identification image captured at a first site may be acquired; according to identification information of a first identifier extracted from the identification image, position information of the first identifier is determined; and thus the first site may be coarsely positioned according to the position information of the first identifier, for example, an approximate position of the first site in indoor floors, indoor regions and/or the like may be determined. Thereafter, according to the determined position information of the first identifier and projection information of the first identifier in the identification image, position information of the first site may be determined, thereby accurately positioning the first site. In the positioning solutions provided by the embodiments of the present disclosure, it is unnecessary to scan indoor positioning scenarios in advance, and it is unnecessary to deploy relevant devices for positioning, such as Bluetooth (BT) devices and hotspot devices, and therefore, the positioning cost is reduced, the positioning manner is simple and the application is flexible and convenient.

In the relevant arts, according to a vision-based localization positioning solution, an image to be positioned in positioning scenarios often needs to be captured by such as a mobile phone or other devices; and the current position of the image may be determined through a correspondence between the image to be positioned and a pre-constructed map. However, this manner requires a light sensitivity and requires that the light intensity in the positioning scenario keeps unchanged as much as possible. Another vision-based positioning solution may use a neutral network based on deep learning, and the neutral network is trained by pre-acquired environmental information of the scenario to be positioned to determine the current position. However, this manner is restricted by the light condition and positioning scenario; and in case of a change of the positioning scenario, the neutral network is required to be retrained, and capturing and labeling of the environmental information in the training process are relatively complex. Therefore, the vision-based positioning solutions usually have high requirements for the captured image to be positioned, and cannot distinguish different positioning of two same scenarios because it is hard to ensure high definitions of the images in movement.

In some relevant arts, there are also positioning solutions based on the BT technology and the hotspot technology. For all of these positioning solutions, it is necessary to make an improvement in the scenario to be positioned and deploy corresponding BT devices and hotspot devices. In case of no positioning, these BT devices and hotspot devices are in an idle state to cause the waste.

According to the positioning solutions provided by the embodiments of the present disclosure, it is unnecessary to capture feature-rich images in the positioning scenario, such that the requirement on the positioning scenario is low, and the positioning manner is flexible and convenient. The positioning solutions provided by the embodiments of the present disclosure may be applied to indoor or outdoor positioning, navigation, expanded scenarios and the like. For example, the first site may be positioned by existing identifiers in the present shopping mall or conference venue to reduce the positioning cost. For another example, advertising boards in a pedestrian street, a residential area and other scenarios may be used for navigation. There are no limits made on the specific application scenarios in the present disclosure.

The positioning solutions provided by the embodiments of the present disclosure are described below with the embodiments.

Figure 1:
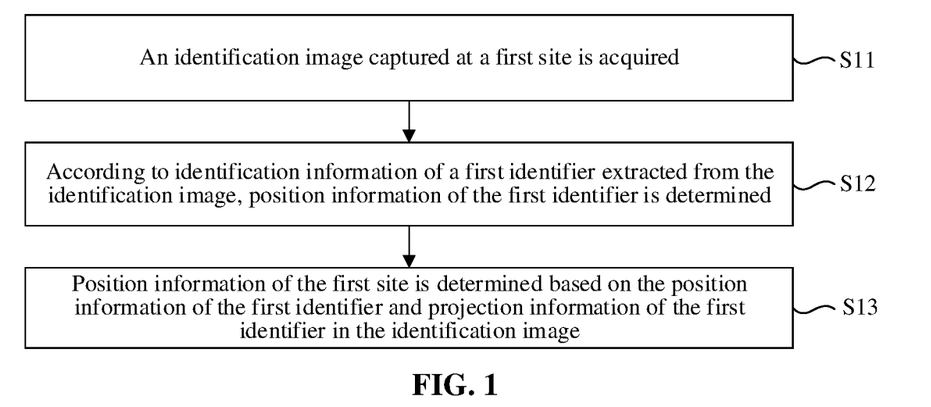
FIG. 1 illustrates a flowchart of a positioning method according to an embodiment of the disclosure.

FIG. 1 illustrates a flowchart of a positioning method according to an embodiment of the disclosure. The positioning method may be performed by a terminal device, a server or other information processing devices. The terminal device may be User Equipment (UE), a mobile device, a user terminal, a terminal, a cell phone, a cordless phone, a Personal Digital Assistant (PDA), a handheld device, a computing device, a vehicle-mounted device, a wearable device, etc. In some possible implementation modes, the positioning method may be implemented by a processor through calling a computer-readable instruction stored in a memory. Hereinafter, the positioning method in the embodiment of the present disclosure will be described by taking, for example, the terminal as a performing entity.

As illustrated in FIG. 1, the positioning method may include the following operations.

In S11, an identification image captured at a first site is acquired.

In the embodiment of the present disclosure, the terminal may acquire the identification image captured by an image capturing device at the first site, or, the terminal may have an image capturing function and directly capture an image at the first site to obtain the identification image. The first site may be a position to be positioned. For example, the first site may be a current position where the user is located, or a destination position specified by the user. The image capturing device may capture an image of a first identifier in surrounding scenarios of the first site to obtain the identification image. The identification image may include the image of the first identifier. The first identifier may be a marker with the identification function in the scenario where the first site is located, and may be a character identifier, an image identifier, a two-dimensional code identifier and/or the like, such as a parking space number identifier for a parking space, a room number card for a room, a store name, a poster and/or a posted two-dimensional code in a shopping mall. The terminal may acquire, in the scenario where the first site is located, the identification image captured for the first identifier.

Herein, the scenario where the first site is located may be an indoor scenario. In some implementation modes, the scenario where the first site is located may be an outdoor scenario, for example the outdoor scenario having the first identifier, such as the pedestrian street, residential area and/or the like.

In S12, according to identification information of a first identifier extracted from the identification image, position information of the first identifier is determined.

In the embodiment of the present disclosure, the terminal may identify the image of the first identifier in the identification image and extract the identification information of the first identifier, and then determine the position information of the first identifier according to the identification information of the first identifier. The identification information of the first identifier may be information for characterizing identification feature(s) of the first identifier, such as character information, two-dimensional code information and/or image feature information. The position information of the first identifier may include position information, coordinate system information and/or the like of the first identifier in the present scenario. Here, the position information may be coordinate information of the first identifier in a world coordinate system, i.e., longitude coordinate information and latitude coordinate information of the first identifier; or, the position information may be coordinate information of the first identifier in a coordinate system of the present scenario, i.e., the coordinate information of the first identifier in the coordinate system of the present scenario.

Herein, a correspondence between the identification information and the position information may be pre-established. For example, before the identification image is acquired, the identification information and the position information of the first identifier may be determined, and then the correspondence between the identification information and the position information is established. In some implementation modes, when the position information of the first identifier is determined, a planar graph of the scenario where the first identifier is located may be acquired first, a reference coordinate system of the scenario is established based on the acquired planar graph, and then according to position information of the first identifier in the planar graph as well as the identification information of the first identifier, the correspondence between the identification information and the position information is established. For example, in a planar graph of each floor in the indoor, the position information of the first identifier of each floor is determined, and then the correspondence between the identification information corresponding to the first identifier and a floor and position where the first identifier is located is established. There may be one or more first identifiers.

In a possible implementation mode, according to the position information of the first identifier, a positioning region of the first site in a present scenario may be determined, here, a difference value between position information of the first site and the position information of the first identifier in the positioning region is less than a preset value. Herein, it may be considered that the first site and the first identifier are located in the same region, such that the first site is coarsely positioned by use of the position information of the first identifier to determine the positioning region of the first site in the present scenario. Since the first site and the first identifier are located in the same region, the distance between the first site and the first identifier in the positioning region is less than a preset value, i.e., the difference value between the position information of the first site and the position information of the first identifier in the positioning region is less than the preset value. For example, a certain regional range in the vicinity of the first identifier may be determined as the positioning region where the first site is located, for example, a region within 5 m from the first identifier is determined as the positioning region where the first site is located.

Herein, in the indoor scenario, the position information of the first identifier may include floor information, thus determining, according to the position information of the first identifier, a floor and a floor region where the first site is located. For example, if the position information of the first identifier indicates that the floor where the first identifier is located is a second floor and the floor region is a middle region, it may be determined that the floor where the first site is located is also the second floor, and the corresponding floor region may also be the middle region. By means of such a manner, the first site can be coarsely positioned, and the indoor region or the outdoor region where the first site is located is quickly determined.

In S13, position information of the first site is determined based on the position information of the first identifier and projection information of the first identifier in the identification image.

In the embodiment of the present disclosure, the image of the first identifier in the identification image may be identified to determine the projection information of the first identifier in the identification image. The projection information may include at least one projection point and at least one projection position, here, the projection point may be the pixel point for representing the first identifier in the identification image, and the projection position may be an image position of the projection point in the identification image. Then, a relative position relationship between the image capturing device and the first identifier is determined according to the projection information of the first identifier in the identification image; and a position of the image capturing device may be determined according to the relative position relationship between the image capturing device and the first identifier as well as the position information of the first identifier, i.e., the position information of the first site may be determined. In an implementation mode, the first site may be a site in an indoor scenario, and determining the position information of the first site may be to determine position information of the first site in the indoor scenario. In this way, on the basis of the coarse positioning of the first site, the first site is accurately positioned, thereby implementing the positioning in the indoor scenario or in the presence of occlusion.

According to the above positioning solutions provided by the embodiment of the present disclosure, the first site may be positioned by the first identifier in the application scenario, and thus the positioning manner is simple and efficient. For example, in application scenarios such as large venues, shopping malls, hospitals and garages, there are a large number of the first identifiers including signs, codes and/or the like. By identifying the first identifiers, the present position of the user in the large venues, shopping malls, hospitals and/or garages can be accurately positioned.

In S12, the position information of the first identifier may be determined according to the identification information of the first identifier. The embodiment of the present disclosure further provides a possible implementation mode for S12; and S12 is described below in combination with the accompanying drawing.

Figure 2:
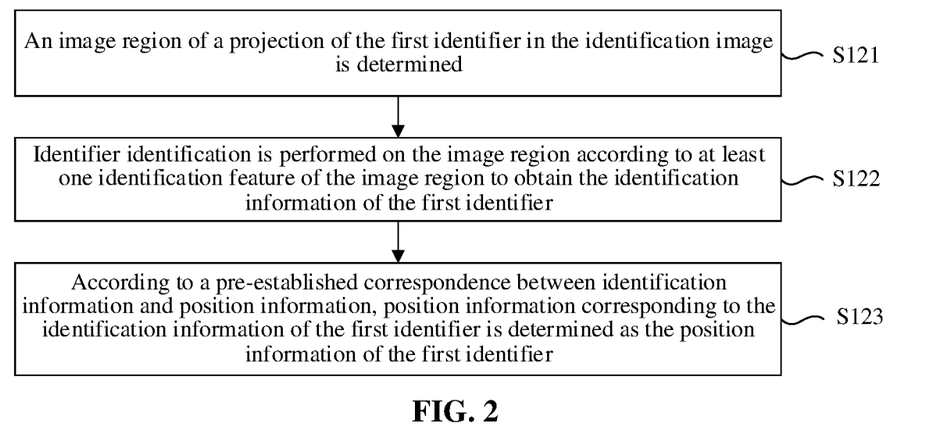
FIG. 2 illustrates a flowchart for determining position information of a first identifier according to an embodiment of the present disclosure.

FIG. 2 illustrates a flowchart for determining position information of a first identifier according to an embodiment of the present disclosure. S12 may include the following operations.

In S121, an image region of a projection of the first identifier in the identification image is determined.

In S122, identifier identification is performed on the image region according to at least one identification feature of the image region to obtain the identification information of the first identifier.

In S123, according to a pre-established correspondence between identification information and position information, position information corresponding to the identification information of the first identifier is determined as the position information of the first identifier.

In the possible implementation mode, the terminal may first perform grey processing on the captured identification image to convert the identification image into a grey image, and then may obtain an outline for the projection of the first identifier according to a grey value of the grey image, thereby determining the image region of the projection of the first identifier in the identification image. Thereafter, identification feature extraction may be performed on the determined image region to obtain at least one identification feature of the image region; the obtained identification feature is matched with pre-stored reference identification features, such that a reference identifier matching the first identifier may be determined; and identification information corresponding to the reference identifier matching the first identifier is acquired, and the identification information may be determined as the identification information of the first identifier. Upon obtaining the identification information of the first identifier, according to the pre-established correspondence between the identification information and the position information, the position information corresponding to the identification information of the first identifier is searched. The searched position information may indicate a position of the first identifier, and the searched position information may be taken as the position information of the first identifier. Thus, the position information of the first identifier can be quickly acquired to improve the positioning efficiency. Here, the projection of the first identifier may be understood as a projection image corresponding to the first identifier in the identification image. The reference identifier may be an identifier pre-stored with identification information and position information. The terminal may pre-store the identification information and position information of the reference identifier, such that the position information of the first identifier may be determined through the identification information of the reference identifier matching the identification information of the first identifier.

Herein, before the identifier identification is performed on the image region according to the at least one identification feature of the image region, the identification image may further be preprocessed, for example, preprocessing of denoising, scaling, directional correction and/or the like is performed on the identification image, thereby better determining the image region where the projection of the first identifier is located, and better extracting the identification features of the image region.

Herein, when the identifier identification is performed on the image region according to the at least one identification feature of the image region, the image region may be divided into multiple identification regions, for example, the first identifier is "hello", and the image region where the projection of the first identifier is located may be divided according to single characters, i.e., the image region where each letter in "hello" is located is determined as one identification region; and then, identification feature extraction is respectively performed on multiple identification regions, and identification features extracted from the multiple identification regions may be combined to obtain the identification information of the first identifier. In this way, the accuracy of identifier identification may be improved, and the condition where two adjacent characters are identified as the same character may be reduced. In some implementation modes, after the image region is divided into multiple identification regions, the identifier feature extraction may be simultaneously performed on the multiple identification regions, i.e., the identifier identification may be concurrently performed on the multiple identification regions in the image region. In this way, the efficiency of identifier identification may be improved.

In S13, the position information of the first site may be determined based on the position information of the first identifier and the projection information of the first identifier in the identification image. The embodiment of the present disclosure further provides a possible implementation mode for S13; and S13 is described below in combination with the accompanying drawing.

Figure 3:
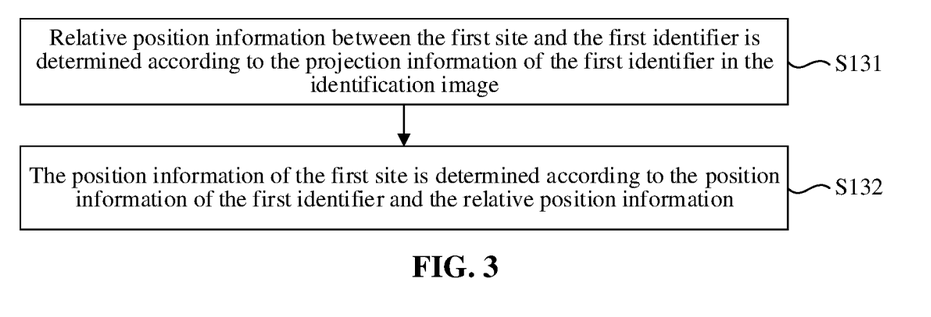
FIG. 3 illustrates a flowchart for determining position information of a first site according to an embodiment of the present disclosure.

FIG. 3 illustrates a flowchart for determining position information of a first site according to an embodiment of the present disclosure. S13 may include the following operations.

In S131, relative position information between the first site and the first identifier is determined according to the projection information of the first identifier in the identification image.

In S132, the position information of the first site is determined according to the position information of the first identifier and the relative position information.

In the possible implementation mode, the projection information of the first identifier in the identification image may include at least one projection point of the first identifier in the identification image and an image position of the projection point in the identification image. The first identifier in the present scenario may be projected to a plane where the identification image is located to obtain the at least one projection point. The position information of the first identifier in the coordinate system of the present scenario is associated with the image position of the projection point in some extent, and thus the relative position information between the first site and the first identifier may be determined according to the projection information of the first identifier in the identification image. Here, the relative position information may be understood as position information of the first site in a reference coordinate system where the first identifier is located by taking the first identifier as a basis reference. For example, if a geographic center of the first identifier is taken as an original point of the reference coordinate system, the relative position information may be coordinate information of the first site in the reference coordinate system. Upon the determination of the relative position information between the first site and the first identifier, the position information of the first identifier and the relative position information may be combined to determine the position information of the first site in the present scenario. The position information of the first site may be coordinate information in a world coordinate system, or may be coordinate information in the coordinate system of the present scenario. The position information of the first site and the position information of the first identifier are located in the same coordinate system, and the present scenario may be the indoor scenario. In this way, the accurate indoor position information of the first site may be obtained through the projection information of the first identifier and the position information of the first identifier to implement the positioning in the indoor scenario.

In a possible implementation mode, when the position information of the first site is determined according to the position information of the first identifier and the relative position information, a distance and a direction of the first site relative to the first identifier may be determined first according to the relative position information, and then, the position information of the first site in the coordinate system of the present scenario is determined according to the position information of the first identifier and the distance and the direction of the first site relative to the first identifier. Herein, the relative position information may be position information of the first site in the reference coordinate system, such that the distance and the direction of the first site relative to the first identifier may be determined according to the relative position information of the first site and reference coordinates of the first identifier in the reference coordinate system, and then, the position information of the first identifier in the coordinate system of the present scenario may be combined with the distance and the direction of the first site relative to the first identifier to obtain the position information of the first site in the coordinate system of the present scenario.

Figure 4:
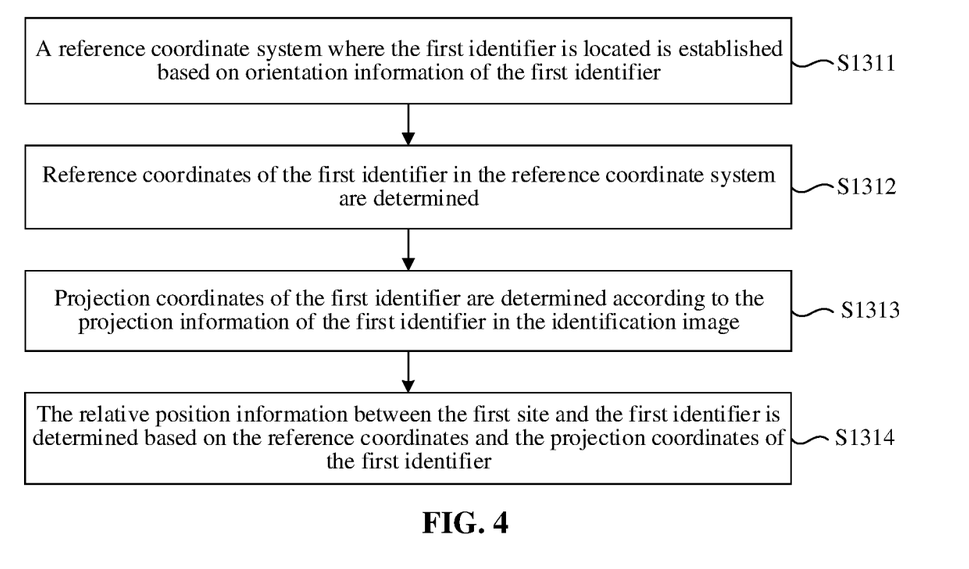
FIG. 4 illustrates a flowchart for determining relative position information of a first site according to an embodiment of the present disclosure.

FIG. 4 illustrates a flowchart for determining relative position information of a first site according to an embodiment of the present disclosure. The embodiment of the present disclosure further provides a possible implementation mode for S131. S131 may include the following operations.

In S1311, a reference coordinate system where the first identifier is located is established based on orientation information of the first identifier.

In S1312, reference coordinates of the first identifier in the reference coordinate system are determined.

In S1313, projection coordinates of the first identifier are determined according to the projection information of the first identifier in the identification image.

In S1314, the relative position information between the first site and the first identifier is determined based on the reference coordinates and the projection coordinates of the first identifier.

In the possible implementation mode, the orientation information of the first identifier may be acquired. The orientation information of the first identifier may be a normal direction of a plane where the first identifier is located, such that the reference coordinate system where the first identifier is located may be established according to the orientation information of the first identifier. A Z-axis direction of the reference coordinate system may be consistent with the orientation information of the first identifier.

Figure 5:
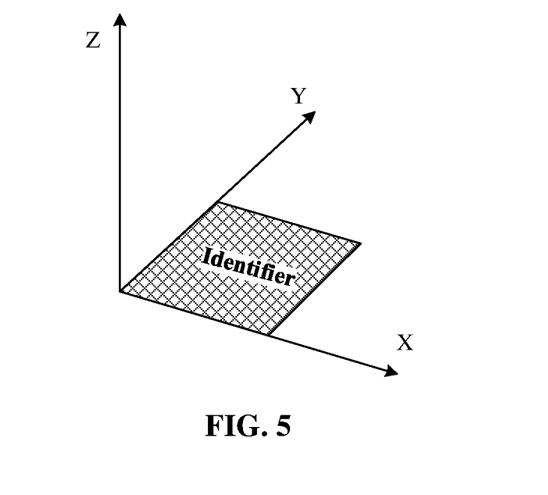
FIG. 5 illustrates a block diagram of an example of a reference coordinate system according to an embodiment of the present disclosure.

FIG. 5 illustrates a block diagram of an example of a reference coordinate system according to an embodiment of the present disclosure. In the example, the reference coordinate system may be established with the vertex at the left lower corner of the first identifier as an original point, the normal direction of the plane where the first identifier is located as a Z-axis direction, the length direction of the first identifier as an X axis and the width direction of the first identifier as a Y axis. Further, multiple reference points may be selected from the first identifier; and according to the projection information of the first identifier in the identification image, projection coordinates of multiple projection points projected by the multiple reference points in the identification image may be determined. Thus, the relative position relationship between the first site and the first identifier may be determined according to reference coordinates of the multiple reference points and the projection coordinates of the corresponding projection points. Herein, the vertex or central point of the first identifier may be selected as the reference point.

In an example, when the projection coordinates of the first identifier are determined according to the projection information of the first identifier in the identification image, an image size and an image resolution of the identification image may be acquired, image coordinates of at least one pixel point in the identification image are determined according to the image size and the image resolution, and projection coordinates of at least one projection point of the first identifier in the identification image are determined according to the projection information of the first identifier in the identification image and the image coordinates of the at least one pixel point.

Herein, the image coordinates may be established in the identification image. For example, the image coordinates may be established with the center of the identification image as an original point, the length direction of the identification image as an X axis and a width direction of the identification image as a Y axis. Then, pixel sizes of one or more pixel points in the identification image may be determined according to the image size and image resolution of the identification image. Different pixel points may have the same pixel size. Next, the pixel sizes of the multiple pixel points are combined with the image size of the identification image, such that image coordinates of the pixel points may be determined. Thereafter, by combining the image coordinates of each pixel point with the projection information of the first identifier, projection coordinates of projection points of the multiple reference points of the first identifier in the identification image may be determined.

In an example, when the relative position information between the first site and the first identifier is determined based on the reference coordinates and the projection coordinates of the first identifier, at least one device parameter of an image capturing device may be acquired; according to the device parameter of the image capturing device, a projection transformation relationship of transforming the reference coordinates of the first identifier into the projection coordinates is determined; and the relative position information between the first site and the first identifier is determined based on the projection transformation relationship as well as the reference coordinates and the projection coordinates of the first identifier. Here, the image capturing device is configured to capture the identification image.

In the example, the reference coordinates of the first identifier may be transformed into the projection coordinates in the identification image through a transformation relationship. The transformation relationship may be associated with the device parameter and pose information of the image capturing device. The device parameter may include internal parameter such as a focal length, a resolution, and/or a Field of View (FOV). The pose information may include position information and attitude information. The device parameter of the image capturing device may be used for determining a projection transformation relationship of transforming the reference coordinates of the first identifier into the projection coordinates, and the projection transformation relationship may be denoted as a projection matrix. The pose information of the image capturing device may be used for determining a pose transformation relationship of transforming the reference coordinates of the first identifier into the projection coordinates, and the pose transformation relationship may be denoted as a pose matrix. Under the combined action of the projection matrix and the pose matrix, the reference coordinates of the first identifier may be transformed into the projection coordinates, and the transformation relationship of transforming the reference coordinates of the first identifier into the projection coordinates may be determined by the projection matrix and the pose matrix together. Herein, the reference coordinates and the projection coordinates of the first identifier are known quantities, the device parameter of the image capturing device is known quantity and the pose information is an unknown quantity, such that according to the reference coordinates and the projection coordinates of the first identifier as well as the device parameter of the image capturing device, the pose information of the image capturing device in the reference coordinate system may be determined, i.e., relative position information of the image capturing device in the reference coordinate system may be obtained. After the relative position information of the image capturing device in the reference coordinate system is obtained, the relative position information may be combined with the position information of the first identifier to determine position information of the image capturing device, i.e., determine the position information of the first site (the image capturing device is located at the first site).

For example, it is assumed that the length and the width of the first identifier are width and height respectively. The left lower vortex of the first identifier is taken as the original point of the reference coordinate system, and the length and the width correspond to the X axis and the Y axis respectively, four reference points A (0, 0), B(width/2, 0), C(0, height/2), and D(width/2, height/2) are selected from the first identifier. Projection coordinates of projection points corresponding to the A, the B, the C and the D are Sa, Sb, Sc and Sd respectively. The projection matrix corresponding to the device parameter of the image capturing device is P, and the pose matrix corresponding to the pose information of the image capturing device in the reference coordinate system may be M. According to the transformation relationship from the image coordinates of the first identifier to the reference coordinates, the following formula may be obtained:

$$Sa = P*M^{-1}*A; \quad \text{Formula (1)}$$

$$Sb = P*M^{-1}*B; \quad \text{Formula (2)}$$

$$Sc = P*M^{-1}*C; \quad \text{Formula (3)}$$

$$Sd = P*M^{-1}*D. \quad \text{Formula (4)}$$

Three of the above formulas are selected to establish an equation set, such that the pose matrix M may be obtained. That is, the reference coordinates of the image capturing device in the reference coordinate system (i.e., position information in the reference coordinate system) may be obtained. Then, according to the position information of the first identifier in the coordinate system of the present scenario, the reference coordinates of the first identifier in the reference coordinate system and the reference coordinates of the image capturing device, the coordinates of the image capturing device in the coordinate system of the present scenario may be obtained, i.e., the position information of the first site in the coordinate system of the present scenario may be obtained.

The positioning solutions provided by the embodiment of the present disclosure may determine the position information of the first site according to the identification information extracted from the identification image; and in the practical applications, the positioning solutions may be used for navigation for the user. The navigation process for the user is described below in combination with one example.

Figure 6:
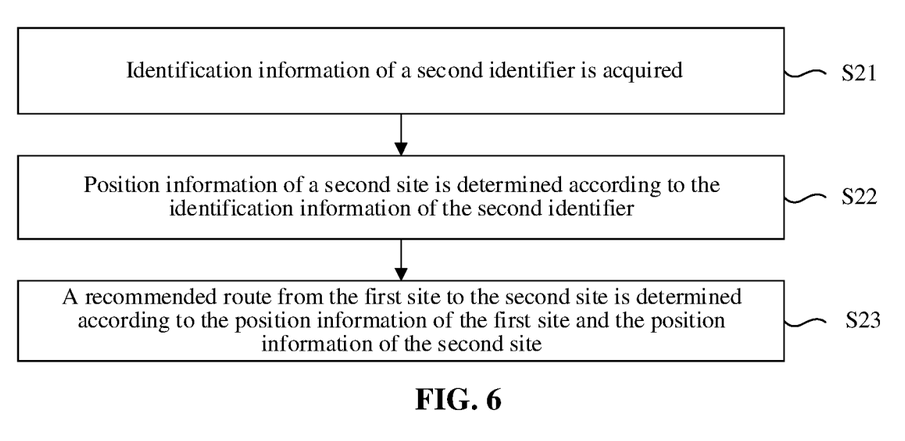
FIG. 6 illustrates a flowchart of a navigation process for a user according to an embodiment of the disclosure.

FIG. 6 illustrates a flowchart of a navigation process for a user according to an embodiment of the disclosure.

In S21, identification information of a second identifier is acquired.

In S22, position information of a second site is determined according to the identification information of the second identifier.

In S23, a recommended route from the first site to the second site is determined according to the position information of the first site and the position information of the second site.

In the example, the identification information of the second identifier may be identification information input by the user, or may be the identification information of the second identifier extracted from an image input by the user. After acquiring the identification information of the second identifier, the terminal may determine the position information corresponding to the second identifier according to the pre-established correspondence between the identification information and the position information. Herein, the position information corresponding to the second identifier may be used as the position information of the second site, or, the position information of the second site may be determined according to the position information of the second identifier by using the positioning manner same as that of the first site. After the position information of the second site is obtained, a recommended route from the first site to the second site may be planned according to the position information of the first site and the position information of the second site, such that the user can reach to the second site from the first site according to the recommended route.

In an application scenario of the example, the user may be located at the first site in the indoor, the first site may be a start point, and the second site may be a target point, to which the user desires to reach, in the indoor. The terminal may capture an identification image of a first identifier at the first site under the operation of the user, acquire identification information of the first identifier in the identification image, and determine position information of the start point according to the identification information of the first identifier. The terminal may acquire identification information of the second identifier input by the user, and determine position information of the target point according to the identification information of the second identifier, and then plan a route from the start point to the target point according to the position information of the start point and the position information of the target point to obtain the recommended route.

In another application scenario of the example, the user may be located a third site in the indoor, the third site may be a start point, and the second site may be a target point, to which the user desires to reach, in the indoor. The terminal may determine position information of the third site through identification information of a third identifier input by the user; or, acquire the identification information of the third identifier through an image of the third identifier captured at the third site, and determines position information of the third site according to the acquired identification information of the third identifier. During moving from the third site to the second site, the user may pass through the first site, or, the user is deviated from the original plan route to pass through the first site. Thus, the present travel route may be adjusted and planned by using the identification image captured at the first site, thereby determining the plan route from the first site to the second site.

It can be understood that the method embodiments mentioned in the present disclosure may be combined with each other to form a combined embodiment without departing from the principle and logic, which is not elaborated in the embodiments of the present disclosure for the sake of simplicity.

In addition, the present disclosure further provides a positioning device, an electronic device, a computer-readable storage medium and a program, all of which may be configured to implement any positioning method provided by the present disclosure. The corresponding technical solutions and descriptions may refer to the corresponding descriptions in the method embodiments and will not elaborated herein.

It may be understood by the person skilled in the art that in the method of the specific implementation modes, the writing sequence of each operation does not mean a strict execution sequence to form any limit to the implementation process, and the specific execution sequence of each operation may be determined in terms of the function and possible internal logic.

Figure 7:
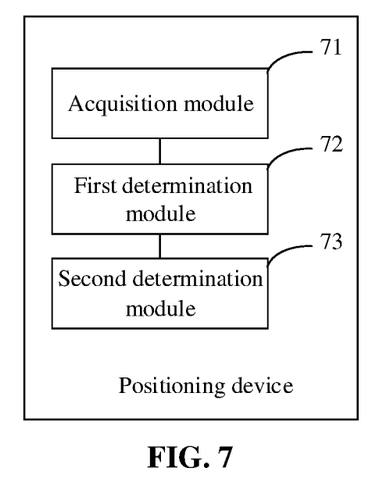
FIG. 7 illustrates a block diagram of a positioning device according to an embodiment of the disclosure.

FIG. 7 illustrates a block diagram of a positioning device according to an embodiment of the present disclosure. As illustrated in FIG. 7, the positioning device may include: an acquisition module 71, a first determination module 72 and a second determination module 73.

The acquisition module 71 is configured to acquire an identification image captured at a first site.

The first determination module 72 is configured to determine, according to identification information of a first identifier extracted from the identification image, position information of the first identifier.

The second determination module 73 is configured to determine position information of the first site based on the position information of the first identifier and projection information of the first identifier in the identification image.

In a possible implementation mode, the first determination module 72 may include a first determination submodule, an identification submodule and a second determination submodule.

The first determination submodule is configured to determine an image region of a projection of the first identifier in the identification image.

The identification submodule is configured to perform identifier identification on the image region according to at least one identification feature of the image region to obtain the identification information of the first identifier.

The second determination submodule is configured to determine, according to a pre-established correspondence between identification information and position information, position information corresponding to the identification information of the first identifier as the position information of the first identifier.

In a possible implementation mode, the device may further include: a third determination module.

The third determination module is configured to determine, according to the position information of the first identifier, a positioning region of the first site in a present scenario, here, a difference value between position information of the first site and the position information of the first identifier in the positioning region is less than a preset value.

In possible implementation mode, the third determination module is specifically configured to determine, according to the position information of the first identifier, a floor and a floor region where the first site is located.

In a possible implementation mode, the second determination module 73 may include: a third determination submodule and a fourth determination submodule.

The third determination submodule is configured to determine relative position information between the first site and the first identifier according to the projection information of the first identifier in the identification image.

The fourth determination submodule is configured to determine the position information of the first site according to the position information of the first identifier and the relative position information.

In a possible implementation mode, the third determination submodule is specifically configured to: establish, based on orientation information of the first identifier, a reference coordinate system where the first identifier is located; determine reference coordinates of the first identifier in the reference coordinate system; determine projection coordinates of the first identifier according to the projection information of the first identifier in the identification image; and determine the relative position information between the first site and the first identifier based on the reference coordinates and the projection coordinates of the first identifier.

In a possible implementation mode, the third determination submodule is specifically configured to: acquire an image size and an image resolution of the identification image; determine image coordinates of at least one pixel point in the identification image according to the image size and the image resolution; and determine projection coordinates of at least one projection point of the first identifier in the identification image according to the projection information of the first identifier in the identification image and the image coordinates of the at least one pixel point.

In a possible implementation mode, the third determination submodule is specifically configured to: acquire at least one device parameter of an image capturing device, here, the image capturing device is configured to capture the identification image; determine, according to the device parameter of the image capturing device, a projection transformation relationship of transforming the reference coordinates of the first identifier into the projection coordinates; and determine the relative position information between the first site and the first identifier based on the projection transformation relationship as well as the reference coordinates and the projection coordinates of the first identifier.

In a possible implementation mode, the fourth determination submodule is specifically configured to: determine a distance and a direction of the first site relative to the first identifier according to the relative position information; and determine the position information of the first site in a coordinate system of a present scenario according to the position information of the first identifier and the distance and the direction of the first site relative to the first identifier.

In a possible implementation mode, the device may further include: a path planning module, configured to: acquire identification information of a second identifier; determine position information of a second site according to the identification information of the second identifier; and determine a plan route from the first site to the second site according to the position information of the first site and the position information of the second site.

In some embodiments, the function or module of the device provided by the embodiment of the present disclosure may be configured to execute the method described in the above method embodiments, and the specific implementation may refer to the description in the above method embodiments. For the simplicity, the details are not elaborated herein.

An embodiment of the present disclosure further provides a computer-readable storage medium, having stored thereon a computer program instruction that, when executed by a processor, causes the processor to execute the abovementioned positioning method. The computer storage medium may be a non-volatile computer-readable storage medium or a volatile computer-readable storage medium.

An embodiment of the present disclosure further provides a computer program; the computer program includes a computer-readable code that, when being run in an electronic device, causes a processor in the electronic device to perform the abovementioned positioning method.

An embodiment of the disclosure further provides an electronic device, which may include: a processor; and a memory configured to store an instruction executable by the processor, here, the processor is configured to execute the abovementioned positioning method.

The electronic device may be provided as a terminal, a server or other types of devices.

Figure 8:
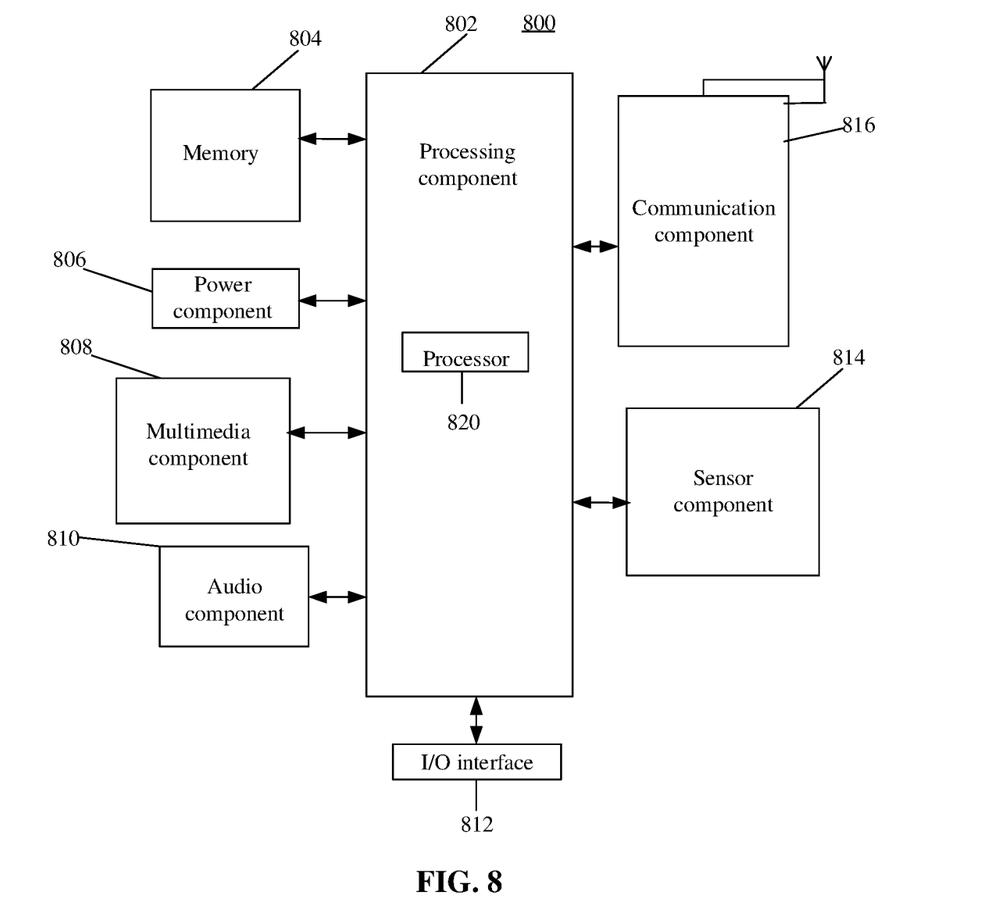
FIG. 8 illustrates a block diagram of an electronic device according to an embodiment of the present disclosure.

FIG. 8 illustrates a block diagram of an electronic device 800 according to an exemplary embodiment. For example, the electronic device 800 may be a terminal such as a mobile phone, a computer, a digital broadcast terminal, a messaging device, a gaming console, a tablet device, a medical device, exercise equipment and a PDA.

Referring to FIG. 8, the electronic device 800 may include one or more of the following components: a processing component 802, a memory 804, a power component 806, a multimedia component 808, an audio component 810, an Input/Output (I/O) interface 812, a sensor component 814, and a communication component 816.

The processing component 802 typically controls overall operations of the electronic device 800, such as the operations associated with display, telephone calls, data communications, camera operations, and recording operations. The processing component 802 may include one or more processors 820 to execute instructions to perform all or part of the operations in the above described methods. Moreover, the processing component 802 may include one or more modules which facilitate the interaction between the processing component 802 and other components. For example, the processing component 802 may include a multimedia module to facilitate the interaction between the multimedia component 808 and the processing component 802.

The memory 804 is configured to store various types of data to support the operation of the electronic device 800. Examples of such data include instructions for any application or method operated on the electronic device 800, contact data, phonebook data, messages, pictures, videos, etc. The memory 804 may be implemented by using any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic or optical disk.

The power component 806 provides power to various components of the electronic device 800. The power component 806 may include a power management system, one or more power sources, and any other components associated with the generation, management, and distribution of power in the electronic device 800.

The multimedia component 808 includes a screen providing an output interface between the electronic device 800 and the user. In some embodiments, the screen may include a Liquid Crystal Display (LCD) and a Touch Panel (TP). If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action, but also sense a period of time and a pressure associated with the touch or swipe action. In some embodiments, the multimedia component 808 includes a front camera and/or a rear camera. The front camera and/or the rear camera may receive external multimedia data when the electronic device 800 is in an operation mode, such as a photographing mode or a video mode. Each of the front camera and the rear camera may be a fixed optical lens system or have focus and optical zoom capability.

The audio component 810 is configured to output and/or input audio signals. For example, the audio component 810 includes a Microphone (MIC) configured to receive an external audio signal when the electronic device 800 is in an operation mode, such as a call mode, a recording mode, and a voice recognition mode. The received audio signal may further be stored in the memory 804 or transmitted via the communication component 816. In some embodiments, the audio component 810 further includes a speaker configured to output audio signals.

The I/O interface 812 provides an interface between the processing component 802 and peripheral interface modules. The peripheral interface modules may be a keyboard, a click wheel, buttons, and the like. The buttons may include, but are not limited to, a home button, a volume button, a starting button, and a locking button.

The sensor component 814 includes one or more sensors to provide status assessments of various aspects of the electronic device 800. For example, the sensor component 814 may detect an on/off status of the electronic device 800 and relative positioning of components, such as a display and small keyboard of the electronic device 800, and the sensor component 814 may further detect a change in a position of the electronic device 800 or a component of the electronic device 800, presence or absence of contact between the user and the electronic device 800, orientation or acceleration/deceleration of the electronic device 800 and a change in temperature of the electronic device 800. The sensor component 814 may include a proximity sensor, configured to detect the presence of nearby objects without any physical contact. The sensor component 814 may also include a light sensor, such as a Complementary Metal Oxide Semiconductor (CMOS) or Charge Coupled Device (CCD) image sensor, configured for use in an imaging application. In some embodiments, the sensor component 814 may also include an accelerometer sensor, a gyroscope sensor, a magnetic sensor, a pressure sensor, or a temperature sensor.

The communication component 816 is configured to facilitate wired or wireless communication between the electronic device 800 and another device. The electronic device 800 may access a communication-standard-based wireless network, such as a Wireless Fidelity (WiFi) network, a 2nd-Generation (2G) or 3rd-Generation (3G) network or a combination thereof. In one exemplary embodiment, the communication component 816 receives a broadcast signal or broadcast associated information from an external broadcast management system via a broadcast channel. In one exemplary embodiment, the communication component 816 further includes a near field communication (NFC) module to facilitate short-range communications. For example, the NFC module may be implemented based on a Radio Frequency Identification (RFID) technology, an Infrared Data Association (IrDA) technology, an Ultra-Wideband (UWB) technology, a Bluetooth (BT) technology, and other technologies.

Exemplarily, the electronic device 800 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is configured to execute the abovementioned method.

In an exemplary embodiment, a nonvolatile computer-readable storage medium, for example, a memory 804 including a computer program instruction, is also provided. The computer program instruction may be executed by a processing component 820 of an electronic device 800 to implement the abovementioned method.

Figure 9:
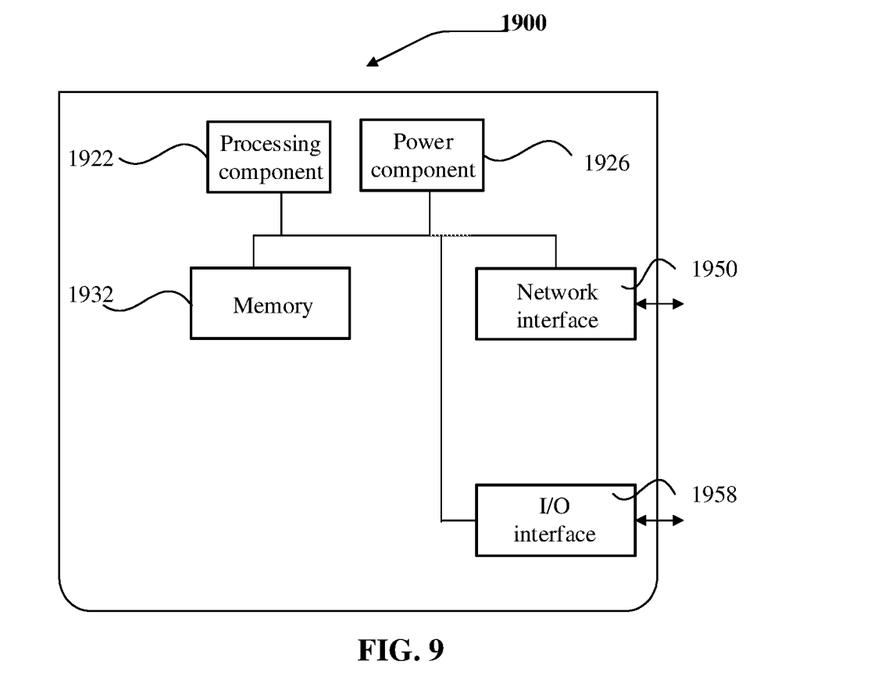
FIG. 9 illustrates a block diagram of an electronic device according to an embodiment of the present disclosure.

FIG. 9 illustrates a block diagram of an electronic device 1900 according to an exemplary embodiment. For example, the electronic device 1900 may be provided as a server. Referring to FIG. 9, the electronic device 1900 includes a processing component 1922, further including one or more processors, and a memory resource represented by a memory 1932, configured to store an instruction executable for the processing component 1922, for example, an application program. The application program stored in the memory 1932 may include one or more modules, with each module corresponding to one group of instructions. In addition, the processing component 1922 is configured to execute the instruction to execute the abovementioned method.

The electronic device 1900 may further include a power component 1926 configured to execute power management of the electronic device 1900, a wired or wireless network interface 1950 configured to connect the electronic device 1900 to a network and an I/O interface 1958. The electronic device 1900 may be operated based on an operating system stored in the memory 1932, for example, Windows Server™, Mac OS X™, Unix™, Linux™, FreeBSD™ or the like.

In an exemplary embodiment, a nonvolatile computer-readable storage medium, for example, a memory 1932 including a computer program instruction, is also provided. The computer program instruction may be executed by a processing component 1922 of an electronic device 1900 to implement the abovementioned method.

The present disclosure may be a system, a method and/or a computer program product. The computer program product may include a computer-readable storage medium, in which a computer-readable program instruction configured to enable a processor to implement each aspect of the present disclosure is stored.

The computer-readable storage medium may be a physical device capable of retaining and storing an instruction used by an instruction execution device. The computer-readable storage medium may be, but not limited to, an electric storage device, a magnetic storage device, an optical storage device, an electromagnetic storage device, a semiconductor storage device or any appropriate combination thereof. More specific examples (non-exhaustive list) of the computer-readable storage medium include a portable computer disk, a hard disk, a Random Access Memory (RAM), a ROM, an EPROM (or a flash memory), an SRAM, a Compact Disc Read-Only Memory (CD-ROM), a Digital Video Disk (DVD), a memory stick, a floppy disk, a mechanical coding device, a punched card or in-slot raised structure with an instruction stored therein, and any appropriate combination thereof. Herein, the computer-readable storage medium is not explained as a transient signal, for example, a radio wave or another freely propagated electromagnetic wave, an electromagnetic wave propagated through a wave guide or another transmission medium (for example, a light pulse propagated through an optical fiber cable) or an electric signal transmitted through an electric wire.

The computer-readable program instruction described here may be downloaded from the computer-readable storage medium to each computing/processing device or downloaded to an external computer or an external storage device through a network such as an Internet, a Local Area Network (LAN), a Wide Area Network (WAN) and/or a wireless network. The network may include a copper transmission cable, an optical fiber transmission cable, a wireless transmission cable, a router, a firewall, a switch, a gateway computer and/or an edge server. A network adapter card or network interface in each computing/processing device receives the computer-readable program instruction from the network and forwards the computer-readable program instruction for storage in the computer-readable storage medium in each computing/processing device.

The computer program instruction configured to execute the operations of the present disclosure may be an assembly instruction, an Instruction Set Architecture (ISA) instruction, a machine instruction, a machine related instruction, a microcode, a firmware instruction, state setting data or a source code or target code edited by one or any combination of more programming languages, the programming language including an object-oriented programming language such as Smalltalk and C++ and a conventional procedural programming language such as "C" language or a similar programming language. The computer-readable program instruction may be completely or partially executed in a computer of a user, executed as an independent software package, executed partially in the computer of the user and partially in a remote computer, or executed completely in the remote server or a server. In a case involved in the remote computer, the remote computer may be connected to the user computer via an type of network including the LAN or the WAN, or may be connected to an external computer (such as using an Internet service provider to provide the Internet connection). In some embodiments, an electronic circuit, such as a programmable logic circuit, a Field Programmable Gate Array (FPGA) or a Programmable Logic Array (PLA), is customized by using state information of the computer-readable program instruction. The electronic circuit may execute the computer-readable program instruction to implement each aspect of the present disclosure.

Herein, each aspect of the present disclosure is described with reference to flowcharts and/or block diagrams of the method, device (system) and computer program product according to the embodiments of the present disclosure. It is to be understood that each block in the flowcharts and/or the block diagrams and a combination of each block in the flowcharts and/or the block diagrams may be implemented by computer-readable program instructions.

These computer-readable program instructions may be provided for a universal computer, a dedicated computer or a processor of another programmable data processing device, thereby generating a machine to further generate a device that realizes a function/action specified in one or more blocks in the flowcharts and/or the block diagrams when the instructions are executed through the computer or the processor of the other programmable data processing device. These computer-readable program instructions may also be stored in a computer-readable storage medium, and through these instructions, the computer, the programmable data processing device and/or another device may work in a specific manner, so that the computer-readable medium including the instructions includes a product including instructions for implementing each aspect of the function/action specified in one or more blocks in the flowcharts and/or the block diagrams.

These computer-readable program instructions may further be loaded to the computer, the other programmable data processing device or the other device, so that a series of operating steps are executed in the computer, the other programmable data processing device or the other device to generate a process implemented by the computer to further realize the function/action specified in one or more blocks in the flowcharts and/or the block diagrams by the instructions executed in the computer, the other programmable data processing device or the other device.

The flowcharts and block diagrams in the drawings illustrate probably implemented system architectures, functions and operations of the system, method and computer program product according to multiple embodiments of the present disclosure. On this aspect, each block in the flowcharts or the block diagrams may represent part of a module, a program segment or an instruction, and part of the module, the program segment or the instruction includes one or more executable instructions configured to realize a specified logical function. In some alternative implementations, the functions marked in the blocks may also be realized in a sequence different from those marked in the drawings. For example, two continuous blocks may actually be executed in a substantially concurrent manner and may also be executed in a reverse sequence sometimes, which is determined by the involved functions. It is further to be noted that each block in the block diagrams and/or the flowcharts and a combination of the blocks in the block diagrams and/or the flowcharts may be implemented by a dedicated hardware-based system configured to execute a specified function or operation or may be implemented by a combination of a special hardware and a computer instruction.

Each embodiment of the present disclosure has been described above. The above descriptions are exemplary, non-exhaustive and also not limited to each disclosed embodiment. Many modifications and variations are apparent to those of ordinary skill in the art without departing from the scope and spirit of each described embodiment of the present disclosure. The terms used herein are selected to explain the principle and practical application of each embodiment or technical improvements in the technologies in the market best or enable others of ordinary skill in the art to understand each embodiment disclosed herein.

The invention claimed is:

1. A positioning method, comprising:
acquiring an identification image captured at a first site;
determining, according to identification information of a first identifier extracted from the identification image, position information of the first identifier; and
determining position information of the first site based on the position information of the first identifier and projection information of the first identifier in the identification image;
wherein determining the position information of the first site based on the position information of the first identifier and the projection information of the first identifier in the identification image comprises:
establishing, based on orientation information of the first identifier, a reference coordinate system where the first identifier is located;
determining reference coordinates of the first identifier in the reference coordinate system;
determining projection coordinates of the first identifier in the identification image according to the projection information of the first identifier in the identification image, wherein the projection information comprises at least one projection point and at least one projection position, the at least one projection point is at least one pixel point representing the first identifier in the identification image and the at least one projection position is at least one image position of the at least one projection point in the identification image;
determining relative position information between the first site and the first identifier based on the reference coordinates and the projection coordinates of the first identifier; and
determining the position information of the first site according to the position information of the first identifier and the relative position information.

2. The method of claim 1, wherein determining, according to the identification information of the first identifier extracted from the identification image, the position information of the first identifier comprises:
determining an image region of a projection of the first identifier in the identification image;
performing identifier identification on the image region according to at least one identification feature of the image region to obtain the identification information of the first identifier; and
determining, according to a pre-established correspondence between identification information and position information, position information corresponding to the identification information of the first identifier as the position information of the first identifier.

3. The method of claim 1, further comprising:
determining, according to the position information of the first identifier, a positioning region of the first site in a present scenario, wherein a difference value between the position information of the first site and the position information of the first identifier in the positioning region is less than a preset value.

4. The method of claim 3, wherein determining, according to the position information of the first identifier, the positioning region of the first site in the present scenario comprises:
determining, according to the position information of the first identifier, a floor and a floor region where the first site is located.

5. The method of claim 1, wherein determining the projection coordinates of the first identifier in the identification image according to the projection information of the first identifier in the identification image comprises:
acquiring an image size and an image resolution of the identification image;
determining image coordinates of at least one pixel point in the identification image according to the image size and the image resolution; and
determining projection coordinates of the at least one projection point of the first identifier in the identification image according to the projection information of the first identifier in the identification image and the image coordinates of the at least one pixel point in the identification image.

6. The method of claim 1, wherein determining the relative position information between the first site and the first identifier based on the reference coordinates and the projection coordinates of the first identifier comprises:
acquiring at least one device parameter of an image capturing device, wherein the image capturing device is configured to capture the identification image;
determining, according to the at least one device parameter of the image capturing device, a projection transformation relationship of transforming the reference coordinates of the first identifier into the projection coordinates; and
determining the relative position information between the first site and the first identifier based on the projection transformation relationship as well as the reference coordinates and the projection coordinates of the first identifier.

7. The method of claim 1, wherein determining the position information of the first site according to the position information of the first identifier and the relative position information comprises:
determining a distance and a direction of the first site relative to the first identifier according to the relative position information; and
determining the position information of the first site in a coordinate system of a present scenario according to the position information of the first identifier and the distance and the direction of the first site relative to the first identifier.

8. The method of claim 1, further comprising:
acquiring identification information of a second identifier;
determining position information of a second site according to the identification information of the second identifier; and
determining a plan route from the first site to the second site according to the position information of the first site and the position information of the second site.

9. An electronic device, comprising:
a processor; and
a memory, coupled with the processor and configured to store an instruction executable by the processor,
wherein the processor is configured to:
acquire an identification image captured at a first site;
determine, according to identification information of a first identifier extracted from the identification image, position information of the first identifier; and
determine position information of the first site based on the position information of the first identifier and projection information of the first identifier in the identification image;
wherein the processor is further configured to:
establish, based on orientation information of the first identifier, a reference coordinate system where the first identifier is located;
determine reference coordinates of the first identifier in the reference coordinate system;
determine projection coordinates of the first identifier in the identification image according to the projection information of the first identifier in the identification image, wherein the projection information comprises at least one projection point and at least one projection position, the at least one projection point is at least one pixel point representing the first identifier in the identification image and the at least one projection position is at least one image position of the at least one projection point in the identification image;
determine relative position information between the first site and the first identifier based on the reference coordinates and the projection coordinates of the first identifier; and
determine the position information of the first site according to the position information of the first identifier and the relative position information.

10. The electronic device of claim 9, wherein the processor is further configured to:
determine an image region of a projection of the first identifier in the identification image;
perform identifier identification on the image region according to at least one identification feature of the image region to obtain the identification information of the first identifier; and
determine, according to a pre-established correspondence between identification information and position information, position information corresponding to the identification information of the first identifier as the position information of the first identifier.

11. The electronic device of claim 9, wherein the processor is further configured to:
determine, according to the position information of the first identifier, a positioning region of the first site in a present scenario, wherein a difference value between the position information of the first site and the position information of the first identifier in the positioning region is less than a preset value.

12. The electronic device of claim 11, wherein the processor is further configured to determine, according to the position information of the first identifier, a floor and a floor region where the first site is located.

13. The electronic device of claim 9, wherein the processor is further configured to:
acquire an image size and an image resolution of the identification image;
determine image coordinates of at least one pixel point in the identification image according to the image size and the image resolution; and
determine projection coordinates of the at least one projection point of the first identifier in the identification image according to the projection information of the first identifier in the identification image and the image coordinates of the at least one pixel point in the identification image.

14. The electronic device of claim 9, wherein the processor is further configured to:
acquire at least one device parameter of an image capturing device, wherein the image capturing device is configured to capture the identification image;
determine, according to the at least one device parameter of the image capturing device, a projection transformation relationship of transforming the reference coordinates of the first identifier into the projection coordinates; and
determine the relative position information between the first site and the first identifier based on the projection transformation relationship as well as the reference coordinates and the projection coordinates of the first identifier.

15. The electronic device of claim 9, wherein the processor is further configured to:
determine a distance and a direction of the first site relative to the first identifier according to the relative position information; and
determine the position information of the first site in a coordinate system of a present scenario according to the position information of the first identifier and the distance and the direction of the first site relative to the first identifier.

16. A non-transitory computer-readable storage medium, having stored thereon a computer program instruction that, when executed by a processor, causes the processor to:
acquire an identification image captured at a first site;
determine, according to identification information of a first identifier extracted from the identification image, position information of the first identifier; and
determine position information of the first site based on the position information of the first identifier and projection information of the first identifier in the identification image;
wherein the computer program instruction, when executed by the processor, further causes the processor to:
establish, based on orientation information of the first identifier, a reference coordinate system where the first identifier is located;
determine reference coordinates of the first identifier in the reference coordinate system;
determine projection coordinates of the first identifier in the identification image according to the projection information of the first identifier in the identification image, wherein the projection information comprises at least one projection point and at least one projection position, the at least one projection point is at least one pixel point representing the first identifier in the identification image and the at least one projection position is at least one image position of the at least one projection point in the identification image;
determine relative position information between the first site and the first identifier based on the reference coordinates and the projection coordinates of the first identifier; and
determine the position information of the first site according to the position information of the first identifier and the relative position information.

* * * * *